US012009128B2

(12) United States Patent
Matsuura et al.

(10) Patent No.: US 12,009,128 B2
(45) Date of Patent: Jun. 11, 2024

(54) COMMON-MODE CHOKE COIL

(71) Applicant: Murata Manufacturing Co., Ltd., Kyoto-fu (JP)

(72) Inventors: Kouhei Matsuura, Nagaokakyo (JP); Atsuo Hirukawa, Nagaokakyo (JP); Hiroshi Ueki, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 527 days.

(21) Appl. No.: 17/165,647

(22) Filed: Feb. 2, 2021

(65) Prior Publication Data

US 2021/0241957 A1 Aug. 5, 2021

(30) Foreign Application Priority Data

Feb. 4, 2020 (JP) ................................ 2020-017320

(51) Int. Cl.

| | |
|---|---|
| ***H01F 17/00*** | (2006.01) |
| ***H01F 17/02*** | (2006.01) |
| ***H01F 27/29*** | (2006.01) |
| ***H01F 41/04*** | (2006.01) |

(52) U.S. Cl.

CPC ......... *H01F 17/0013* (2013.01); *H01F 17/02* (2013.01); *H01F 27/29* (2013.01); *H01F 41/043* (2013.01); *H01F 2017/002* (2013.01); *H01F 2017/0093* (2013.01)

(58) Field of Classification Search

CPC ........ H01F 7/0013; H01F 17/02; H01F 27/29; H01F 2017/002; H01F 2017/0093

USPC .......................................................... 336/192

See application file for complete search history.

(56) References Cited

U.S. PATENT DOCUMENTS

| | | | | |
|---|---|---|---|---|
| 5,250,923 A * | 10/1993 | Ushiro | H01F 17/0013 | 336/200 |
| 6,157,285 A * | 12/2000 | Tokuda | H01F 17/0013 | 336/200 |
| 6,618,929 B2 * | 9/2003 | Kitamura | H01F 17/0013 | 336/200 |
| 6,696,911 B2 * | 2/2004 | Tomohiro | H01F 17/0013 | 336/200 |

(Continued)

FOREIGN PATENT DOCUMENTS

| | | |
|---|---|---|
| CN | 1425183 A | 6/2003 |
| JP | S51-42043 Y1 | 10/1976 |

(Continued)

*Primary Examiner* — Shawki S Ismail
*Assistant Examiner* — Joselito S. Baisa
(74) *Attorney, Agent, or Firm* — Studebaker & Brackett PC

(57) ABSTRACT

A common-mode choke coil includes a multilayer body, a first coil, a second coil, a first terminal electrode, a second terminal electrode, a third terminal electrode, and a fourth terminal electrode. The multilayer body includes plural non-conductor layers. The first and second coils are incorporated in the multilayer body. The first and second terminal electrodes are connected to the first coil. The third and fourth terminal electrodes are connected to the second coil. The first coil includes a first coil conductor. The second coil includes a second coil conductor disposed along an interface between non-conductor layers different from an interface between non-conductor layers along which the first coil conductor is disposed. The first and second coil conductors each have a number of turns of less than 2.

20 Claims, 5 Drawing Sheets

(56) References Cited

U.S. PATENT DOCUMENTS

| | | | |
|---|---|---|---|
| 7,064,692 | B1 * | 6/2006 | Kosht .................. H03M 1/645 341/112 |
| 7,091,816 | B1 | 8/2006 | Ito et al. |
| 8,505,192 | B2 * | 8/2013 | Chu ..................... H01F 27/292 29/729 |
| 9,245,680 | B2 * | 1/2016 | Kitamura ........... H01F 17/0013 |
| 9,865,388 | B2 | 1/2018 | Ishida et al. |
| 2003/0052766 | A1 * | 3/2003 | Tomohiro .......... H01F 17/0013 336/200 |
| 2003/0076211 | A1 | 4/2003 | Matsuta et al. |
| 2003/0134612 | A1 | 7/2003 | Nakayama et al. |
| 2004/0263309 | A1 | 12/2004 | Ito et al. |
| 2005/0068148 | A1 | 3/2005 | Yoshida et al. |
| 2006/0158301 | A1 | 7/2006 | Shinkai et al. |
| 2007/0040163 | A1 | 2/2007 | Okuzawa et al. |
| 2007/0205856 | A1 | 9/2007 | Matsunaga et al. |
| 2007/0285202 | A1 | 12/2007 | Ito et al. |
| 2008/0129439 | A1 | 6/2008 | Nishikawa et al. |
| 2008/0130258 | A1 | 6/2008 | Kudo et al. |
| 2008/0303621 | A1 | 12/2008 | Ito et al. |
| 2011/0316658 | A1 * | 12/2011 | Liu ....................... H05K 1/165 336/200 |
| 2012/0119863 | A1 * | 5/2012 | Wu .................... H01F 17/0013 29/832 |
| 2013/0222104 | A1 | 8/2013 | Kitamura et al. |
| 2013/0234820 | A1 | 9/2013 | Yoo et al. |
| 2016/0104569 | A1 | 4/2016 | Kato et al. |
| 2017/0004918 | A1 | 1/2017 | Kido et al. |
| 2017/0047155 | A1 | 2/2017 | Yao et al. |
| 2017/0287619 | A1 | 10/2017 | Sim et al. |
| 2018/0367115 | A1 | 12/2018 | Oomori et al. |
| 2019/0164676 | A1 | 5/2019 | Tsuduki et al. |
| 2021/0304942 | A1 | 9/2021 | Kawashima et al. |

FOREIGN PATENT DOCUMENTS

| | | | | |
|---|---|---|---|---|
| JP | H11-102817 | A | | 4/1999 |
| JP | 2005012072 | A | * | 1/2005 |
| JP | 2005-166791 | A | | 6/2005 |
| JP | 2005-317725 | A | | 11/2005 |
| JP | 2006-303209 | A | | 11/2006 |
| JP | 2006-313946 | A | | 11/2006 |
| JP | 2008-306014 | A | | 12/2008 |
| JP | 2009-231307 | A | | 10/2009 |
| JP | 2009-239770 | A | | 10/2009 |
| JP | 2009-302580 | A | | 12/2009 |
| JP | 2010-141642 | A | | 6/2010 |
| JP | 2011-176165 | A | | 9/2011 |
| JP | 2013-219295 | A | | 10/2013 |
| JP | 2018-195984 | A | | 12/2018 |
| JP | 2019-102507 | A | | 6/2019 |
| WO | 01/67470 | A1 | | 9/2001 |
| WO | 2006/057115 | A1 | | 6/2006 |
| WO | 2017/221794 | A1 | | 12/2017 |

* cited by examiner

COMMON-MODE CHOKE COIL

CROSS-REFERENCE TO RELATED APPLICATION

This application claims benefit of priority to Japanese Patent Application No. 2020-017320, filed Feb. 4, 2020, the entire content of which is incorporated herein by reference.

BACKGROUND

Technical Field

The present disclosure relates to a common-mode choke coil. More specifically, the present disclosure relates to a multilayer common-mode choke coil including a multilayer body with plural stacked non-conductor layers, and first and second coils incorporated in the multilayer body.

Background Art

A technique that is of interest for the present disclosure is described in, for example, Japanese Unexamined Patent Application Publication No. 2006-313946. The technique described in Japanese Unexamined Patent Application Publication No. 2006-313946 relates to a multilayer common-mode choke coil. The common-mode choke coil is an ultra-small thin-film common-mode choke coil, and capable of high-speed transmission of transmission signals at frequencies near the GHz range. More specifically, Japanese Unexamined Patent Application Publication No. 2006-313946 describes a common-mode choke coil with a cutoff frequency of greater than or equal to 2.4 GHz, the cutoff frequency being defined as the frequency at which the attenuation of a transmission signal (differential-mode signal) reaches −3 dB.

Advances in high-speed communication technology have led to the growing need for a multilayer common-mode choke coil that can, at increasingly higher frequencies, transmit differential-mode signals and attenuate common-mode noise components.

SUMMARY

Accordingly, the present disclosure provides a multilayer common-mode choke coil that can, at higher frequencies such as 20 GHz to 30 GHz, and even at very high frequencies such as above 30 GHz, transmit differential-mode signals, and suppress common-mode noise components.

A common-mode choke coil according to preferred embodiments of the present disclosure includes a multilayer body, a first coil, a second coil, a first terminal electrode, a second terminal electrode, a third terminal electrode, and a fourth terminal electrode. The multilayer body includes a plurality of non-conductor layers, the plurality of non-conductor layers being stacked and each made of a non-conductor. The first coil and the second coil are incorporated in the multilayer body. The first terminal electrode and the second terminal electrode are provided on an outer surface of the multilayer body, the first terminal electrode being electrically connected to a first end, the second terminal electrode being electrically connected to a second end, the first end and the second end being different ends of the first coil. The third terminal electrode and the fourth terminal electrode are provided on an outer surface of the multilayer body, the third terminal electrode being electrically connected to a third end, the fourth terminal electrode being electrically connected to a fourth end, the third end and the fourth end being different ends of the second coil.

The plurality of non-conductor layers include a first plurality of non-conductor layers and a second plurality of non-conductor layers. The first coil includes a first coil conductor disposed along a first interface, the first interface being an interface between the first plurality of non-conductor layers. The second coil includes a second coil conductor disposed along a second interface, the second interface being an interface between the second plurality of non-conductor layers.

To address the above-mentioned technical problem, according to preferred embodiments of the present disclosure, the first coil conductor and the second coil conductor each have a number of turns of less than 2.

According to preferred embodiment of the present disclosure, the stray capacitance between the first coil and the second coil can be reduced to thereby improve high-frequency characteristics.

Other features, elements, characteristics and advantages of the present disclosure will become more apparent from the following detailed description of preferred embodiments of the present disclosure with reference to the attached drawings.

DETAILED DESCRIPTION

With reference to FIGS. 1 through 4, a common-mode choke coil 1 according to an embodiment of the present disclosure is described below.

Figure 1:
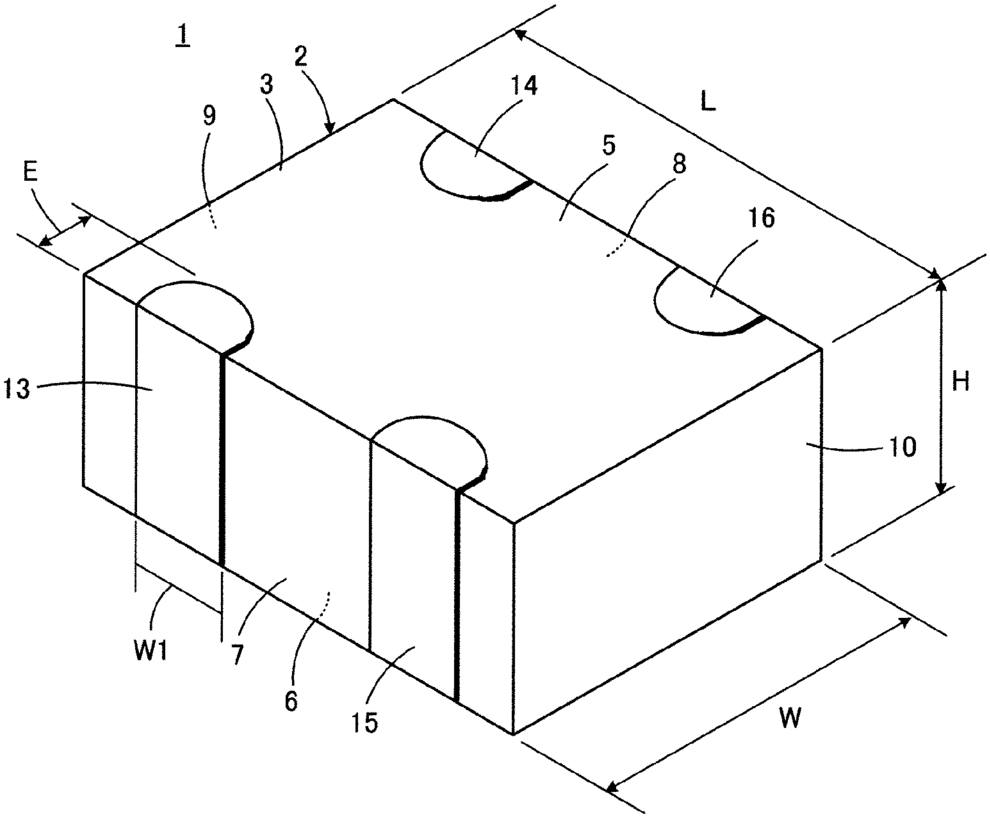
FIG. 1 is a perspective view of a common-mode choke coil according to an embodiment of the present disclosure, illustrating the outward appearance of the common-mode choke coil.
Figure 2:
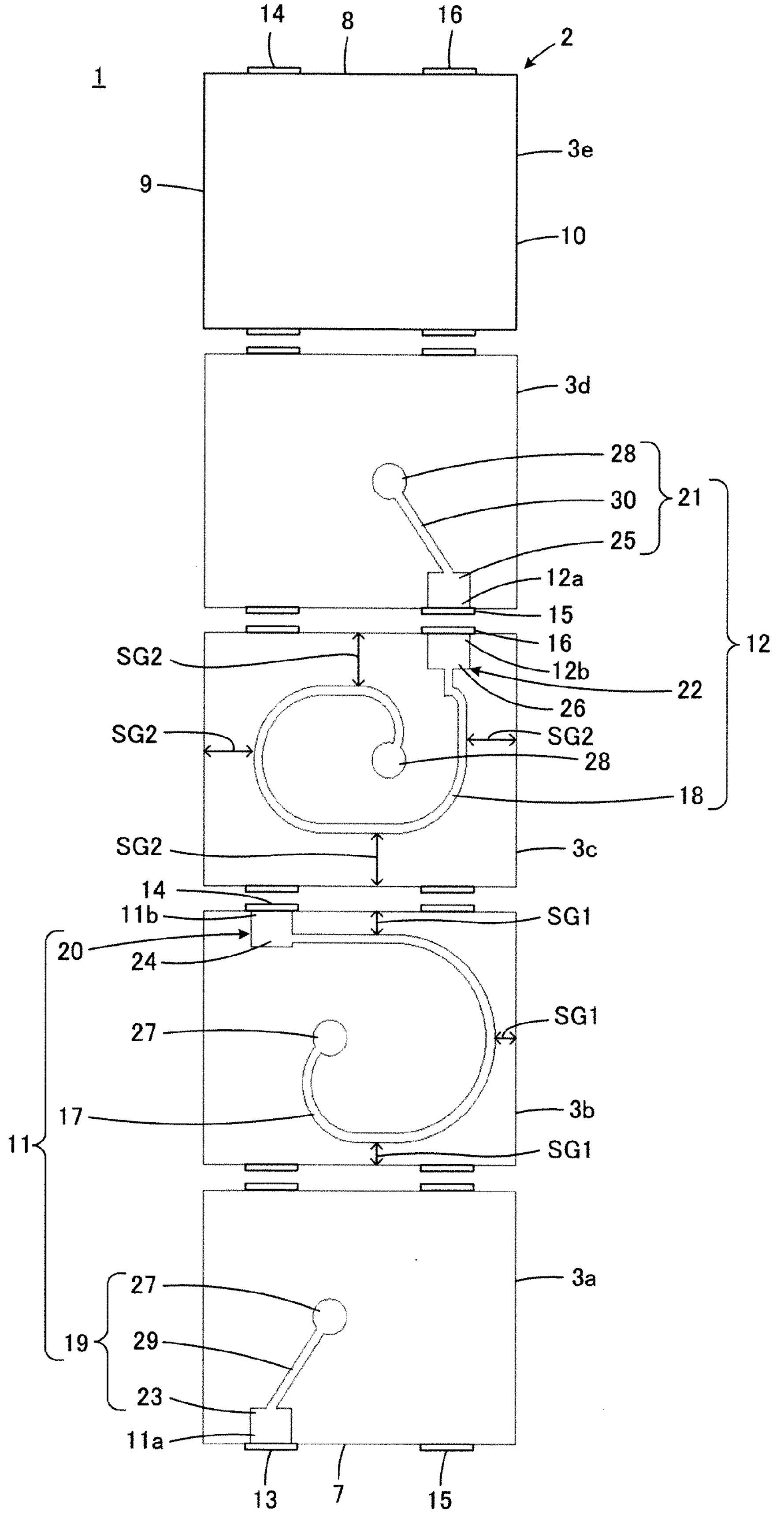
FIG. 2 is an exploded plan view of the major components of the common-mode choke coil illustrated in FIG. 1.

As illustrated in FIG. 1, the common-mode choke coil 1 includes a multilayer body 2 having plural stacked non-conductor layers. FIG. 2 depicts representative non-conductor layers 3*a*, 3*b*, 3*c*, 3*d*, and 3*e* among these non-conductor layers. In the following description, unless individual non-conductor layers are to be distinguished from each other such as in the case of the non-conductor layers 3*a*, 3*b*, 3*c*, 3*d*, and 3*e* illustrated in FIG. 2, reference sign "3" is used for non-conductor layers to generically describe each non-conductor layer. Each non-conductor layer 3 is made of a non-conductor, examples of which include glass and ceramic materials.

The multilayer body 2 is substantially a cuboid in shape that has a first major face 5, a second major face 6, a first lateral face 7, a second lateral face 8, a first end face 9, and a second end face 10. The first major face 5 and the second major face 6 extend in the direction in which the non-conductor layers 3 extend, and are opposite to each other. The first lateral face 7 and the second lateral face 8 couple the first major face 5 and the second major face 6 to each other, and are opposite to each other. The first end face 9 and the second end face 10 couple the first major face 5 and the second major face 6 to each other and couple the first lateral face 7 and the second lateral face 8 to each other, and are opposite to each other. The cuboid may be, for example, rounded or chamfered in its edge and corner portions.

Figure 3:
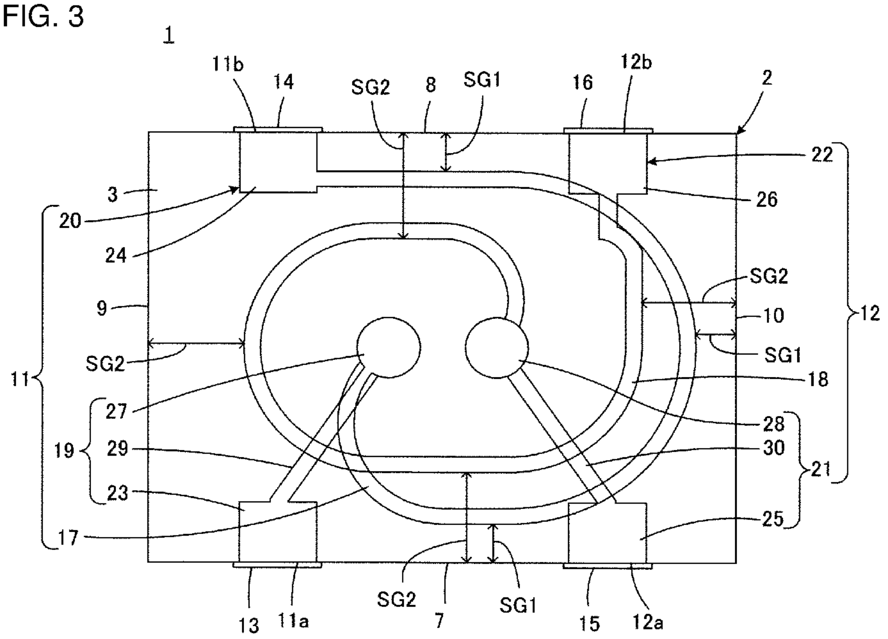
FIG. 3 is a plan view of the common-mode choke coil illustrated in FIG. 1, representing a schematic see-through illustration, as viewed in the direction of stacking, of first and second coils incorporated in a multilayer body.

As illustrated in FIGS. 2 and 3, the common-mode choke coil 1 includes a first coil 11 and a second coil 12 that are incorporated in the multilayer body 2. As illustrated in FIG. 1, the common-mode choke coil 1 also includes the following terminal electrodes provided on the outer surface of the multilayer body 2: a first terminal electrode 13, a second terminal electrode 14, a third terminal electrode 15, and a fourth terminal electrode 16. More specifically, the first terminal electrode 13 and the third terminal electrode 15 are provided on the first lateral face 7, and the second terminal electrode 14 and the fourth terminal electrode 16, which are respectively symmetrical in shape to the first terminal electrode 13 and the third terminal electrode 15, are provided on the second lateral face 8.

As illustrated in FIG. 2, the first terminal electrode 13 and the second terminal electrode 14 are respectively electrically connected to a first end 11*a* and a second end 11*b*, which are different ends of the first coil 11. The third terminal electrode 15 and the fourth terminal electrode 16 are respectively electrically connected to a third end 12*a* and a fourth end 12*b*, which are different ends of the second coil 12.

The following description assumes that the non-conductor layers 3*a*, 3*b*, 3*c*, 3*d*, and 3*e* are stacked from the bottom to the top in the order depicted in FIG. 2.

Referring to FIG. 2, the first coil 11 has a first coil conductor 17 disposed along the interface between the non-conductor layers 3*b* and 3*c*. The first coil 11 has a first extended conductor 19, and a second extended conductor 20. The first extended conductor 19 provides the first coil 11 with the first end 11*a*. The second extended conductor 20 provides the first coil 11 with the second end 11*b*. The first extended conductor 19 includes a first connection end portion 23. The first connection end portion 23 is connected to the first terminal electrode 13 at a location on the outer surface of the multilayer body 2. The second extended conductor 20 includes a second connection end portion 24. The second connection end portion 24 is connected to the second terminal electrode 14 at a location on the outer surface of the multilayer body 2.

The first connection end portion 23 is disposed along the interface between the non-conductor layers 3*a* and 3*b* different from the interface between the non-conductor layers 3*b* and 3*c* along which the first coil conductor 17 is disposed. The first extended conductor 19 includes a first via-conductor 27, and a first coupling part 29. The first via-conductor 27 is connected to the first coil conductor 17, and penetrates the non-conductor layer 3*b*, which is located between the first coil conductor 17 and the first connection end portion 23, in the thickness direction of the non-conductor layer 3*b*. The first coupling part 29 is disposed along the interface between the non-conductor layers 3*a* and 3*b* along which the first connection end portion 23 is disposed. The first coupling part 29 connects the first via-conductor 27 and the first connection end portion 23 to each other. The first coupling part 29 is preferably shaped to extend substantially linearly. This makes it possible to reduce the inductance resulting from the first coupling part 29, leading to improved high-frequency characteristics.

As described below, the second coil 12 also has elements similar to those of the first coil 11.

The second coil 12 includes a second coil conductor 18 disposed along the interface between the non-conductor layers 3*c* and 3*d*. The second coil 12 includes a third extended conductor 21, and a fourth extended conductor 22. The third extended conductor 21 provides the second coil 12 with the third end 12*a*. The fourth extended conductor 22 provides the second coil 12 with the fourth end 12*b*. The third extended conductor 21 includes a third connection end portion 25. The third connection end portion 25 is connected to the third terminal electrode 15 at a location on the outer surface of the multilayer body 2. The fourth extended conductor 22 includes a fourth connection end portion 26. The fourth connection end portion 26 is connected to the fourth terminal electrode 16 at a location on the outer surface of the multilayer body 2.

The third connection end portion 25 is disposed along the interface between the non-conductor layers 3*d* and 3*e* different from the interface between the non-conductor layers 3*c* and 3*d* along which the second coil conductor 18 is disposed. The third extended conductor 21 includes a second via-conductor 28, and a second coupling part 30. The second via-conductor 28 is connected to the second coil conductor 18, and penetrates the non-conductor layer 3*d*, which is located between the second coil conductor 18 and the third connection end portion 25, in the thickness direction of the non-conductor layer 3*d*. The second coupling part 30 is disposed along the interface between the non-conductor layers 3*d* and 3*e* along which the third connection end portion 25 is disposed. The second coupling part 30 connects the second via-conductor 28 and the third connection end portion 25 to each other. As with the first coupling part 29 mentioned above, the second coupling part 30 is preferably shaped to extend substantially linearly. This makes it possible to reduce the inductance resulting from the second coupling part 30, leading to improved high-frequency characteristics.

The common-mode choke coil 1 is mounted with the second major face 6 of the multilayer body 2 directed toward a mounting substrate. In one exemplary embodiment of the common-mode choke coil 1, the multilayer body 2 has a length dimension L of greater than or equal to about 0.55 mm and less than or equal to about 0.75 mm (i.e., from about 0.55 mm to about 0.75 mm), which is defined between the first and second end faces 9 and 10 that are opposite to each other, a width dimension W of greater than or equal to about 0.40 mm and less than or equal to about 0.60 mm (i.e., from about 0.40 mm to about 0.60 mm), which is defined between the first and second lateral faces 7 and 8 that are opposite to each other, and a height dimension H of greater than or equal to about 0.20 mm and less than or equal to about 0.40 mm (i.e., from about 0.20 mm to about 0.40 mm), which is defined between the first and second major faces 5 and second major face 6 that are opposite to each other.

As is apparent from FIGS. 2 and 3, the first and second coil conductors 17 and 18 of the common-mode choke coil 1 each have a number of turns of less than about 2. At least one of the first and second coil conductors 17 and 18 has a number of turns of preferably less than or equal to about 1.5, more preferably less than or equal to about 1.

Figure 4:
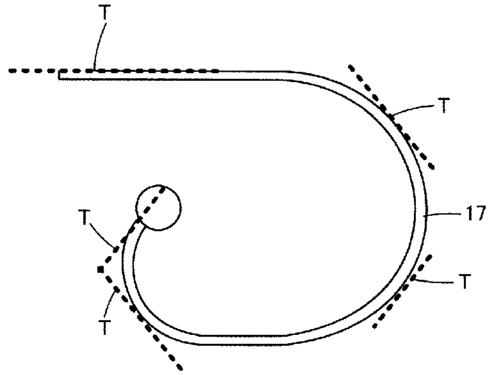
FIG. 4 is a plan view of a first coil conductor included in the first coil of the common-mode choke coil illustrated in FIG. 1, explaining the number of turns of the first coil conductor.

The number of turns mentioned above is defined as follows. The first coil conductor 17 and the second coil conductor 18 each have a portion that extends in a substantially arcuate shape. Referring now to FIG. 4, the first coil conductor 17 of the first coil 11 is described below. As illustrated in FIG. 4, a tangent T is drawn sequentially along the outer periphery of the coil conductor 17 from the beginning end of the coil conductor 17 to the terminating end, and when the tangent T has rotated 360 degrees, this is defined as one turn. For the coil conductor 17 illustrated in FIG. 4, the tangent T has rotated approximately 307 degrees, and hence the number of turns of the coil conductor 17 can be defined as approximately 0.85. The number of turns is defined in the same manner also for the second coil conductor 18 of the second coil 12.

The smaller the number of turns of the first coil conductor 17 and the number of turns of the second coil conductor 18, the more the stray capacitance generated between the first coil 11 and the second coil 12, more specifically, the stray capacitance generated between the first coil conductor 17 and the second coil conductor 18 can be reduced. Hence, a smaller number of turns allows for improved high-frequency characteristics of the common-mode choke coil 1. There is no particular lower limit for the number of turns of each of the first coil conductor 17 and the second coil conductor 18. Although, extremely speaking, the number of turns may be any value greater than 0, the number of turns is preferably about 0.5.

Preferably, as clearly illustrated in FIG. 3, with the first coil conductor 17 and the second coil conductor 18 being viewed in plan in the stacking direction of the multilayer body 2, the first coil conductor 17 and the second coil conductor 18 have no portion where the two coil conductors overlap each other, except for a portion where the two coil conductors cross each other. This also contributes to reducing the stray capacitance generated between the first coil 11 and the second coil 12. As a result, the high-frequency characteristics of the common-mode choke coil 1 can be improved.

As is apparent from FIG. 3, with the first coil conductor 17 and the second coil conductor 18 being viewed in plan in the stacking direction of the multilayer body 2, the first coil conductor 17 and the second coil conductor 18 cross each other at two locations. By ensuring that the first coil conductor 17 and the second coil conductor 18 cross each other at two or less locations in this way, the stray capacitance generated between the first coil conductor 17 and the second coil conductor 18 is reduced. This can contribute to improved high-frequency characteristics.

Preferably, the first coil conductor 17 and the second coil conductor 18 have a distance between each other of greater than or equal to about 6 μm and less than or equal to about 26 μm (i.e., from about 6 μm to about 26 μm). If the distance is less than about 6 μm, this may cause the stray capacitance generated between the first coil conductor 17 and the second coil conductor 18 to become large enough to degrade high-frequency characteristics. By contrast, if the distance is greater than about 26 μm, this may cause a decrease in the coefficient of coupling between the first coil 11 and the second coil 12.

Although each of the non-conductor layers 3*a*, 3*b*, 3*c*, 3*d*, and 3*e* is depicted in FIG. 2 as being a single layer, at least some of these non-conductor layers may be made up of plural layers. Accordingly, for example, the above-mentioned adjustment of the distance between the first coil conductor 17 and the second coil conductor 18 may be made either by changing the thickness of the non-conductor layer 3*c* formed as a single layer, or by changing the number of layers constituting the non-conductor layer 3*c*.

Preferably, each of the first coil conductor 17 and the second coil conductor 18 has a line width of greater than or equal to about 10 μm and less than or equal to about 24 μm (i.e., from about 10 μm to about 24 μm). If the line width is less than about 10 μm, this may cause the coil conductors 17 and 18 to have an increased direct-current resistance. By contrast, if the line width is greater than about 24 μm, this may cause the stray capacitance generated between the first coil conductor 17 and the second coil conductor 18 to become large enough to degrade high-frequency characteristics.

The terminal electrodes 13 to 16 extend over an area from the first major face 5 to the second major face 6. In this regard, each of the terminal electrodes 13 to 16 has a width on the first lateral face 7 or the second lateral face 8 (the width of the first terminal electrode 13 on the first lateral face 7 is denoted by "W1" in FIG. 1) of preferably greater than or equal to about 0.1 mm and less than or equal to about 0.25 mm (i.e., from about 0.1 mm to about 0.25 mm), more preferably greater than or equal to about 0.15 mm. If the line width is less than about 0.1 mm, this may result in insufficient fixing strength when the common-mode choke coil 1 is mounted onto the mounting substrate. By contrast, if the line width is greater than about 0.25 mm, this may cause Scc21, which represents the transmission characteristic of the common-mode choke coil 1 for common-mode components, to peak at a frequency of less than about 30 GHz.

Each of the terminal electrodes 13 to 16 is depicted in FIG. 1 as being partially extended to the first major face 5. Although not depicted in FIG. 1, each of the terminal electrodes 13 to 16 is partially extended also to the second major face 6. This extended portion has a dimension E of preferably greater than or equal to about 0.02 mm and less than or equal to about 0.2 mm (i.e., from about 0.02 mm to about 0.2 mm), more preferably less than or equal to about 0.17 mm A dimension E less than about 0.02 mm may cause a decrease in the strength with which the common-mode choke coil 1 is fixed to the mounting substrate when mounted onto the mounting substrate. By contrast, a dimension E greater than about 0.2 mm may cause Scc21, which represents the transmission characteristic of the common-mode choke coil 1 for common-mode components, to peak at a frequency of less than about 30 GHz.

Reference is now made to a preferred manufacturing method for the common-mode choke coil 1.

The following process is performed to produce a glass-ceramic sheet that is to become each non-conductor layer 3. First, $K_2O$, $B_2O_3$, and $SiO_2$, and as required, $Al_2O_3$ are weighed in a predetermined ratio, put into a crucible made of platinum, and melted by being raised to a temperature of about 1500 to 1600° C. in a firing furnace. The resulting melted substance is rapidly cooled to yield a glass material.

An example of the above-mentioned glass material is a glass material containing at least K, B, and Si, with K contained at a $K_2O$ equivalent of about 0.5 to 5 mass %, B at a $B_2O_3$ equivalent of about 10 to 25 mass %, Si at an $SiO_2$ equivalent of about 70 to 85 mass %, and Al at an $Al_2O_3$ equivalent of about 0 to 5 mass %.

Subsequently, the above-mentioned glass material is pulverized to obtain glass powder with a D50 particle size (particle size equivalent to 50% of the volume-based cumulative percentage) of about 1 to 3 μm.

Subsequently, alumina powder and quartz ($SiO_2$) powder both having a D50 particle size of about 0.5 to 2.0 μm are added to the above-mentioned glass powder. The resulting powder is charged into a ball mill together with PSZ media. Further, an organic binder such as a polyvinyl butyral-based organic binder, an organic solvent such as ethanol or toluene, and a plasticizer are charged into the ball mill and mixed together to obtain a glass-ceramic slurry.

Then, the slurry is formed into a sheet with a film thickness of about 20 to 30 μm by a method such as the doctor blade method, and the obtained sheet is punched in a substantially rectangular shape. Plural glass-ceramic sheets are thus obtained.

Examples of inorganic components contained in each glass-ceramic sheet mentioned above include a dielectric glass material containing about 60 to 66 mass % of a glass material, about 34 to 37 mass % of quartz, and about 0.5 to 4 mass % of alumina.

Meanwhile, a conductive paste containing Ag as a conductive component and used for forming the first coil 11 and the second coil 12 is prepared.

Subsequently, a predetermined glass-ceramic sheet is subjected to, for example, irradiation with laser light to thereby provide the glass-ceramic sheet with a through-hole in which to place each of via-conductors 27 and 28. Then, the conductive paste is applied to the predetermined glass-ceramic sheet by, for example, screen printing. Thus, the via-conductors 27 and 28 with the conductive paste filling the above-mentioned through-hole are formed, and the coil conductors 17 and 18, the connection end portions 23 to 26 respectively constituting the extended conductors 19 to 22, and the coupling parts 29 and 30 are formed in a patterned state.

Subsequently, plural glass-ceramic sheets are stacked such that the non-conductor layers 3*a* to 3*e* stacked in the order illustrated in FIG. 2 can be obtained. At this time, on the top and bottom of the stack of these glass-ceramic sheets, a suitable number of glass-ceramic sheets with no through-hole provided therein and no conductive paste applied thereto are further stacked as required.

Subsequently, the stacked glass-ceramic sheets are subjected to a warm isotropic press process at a temperature of about 80° C. and a pressure of about 100 MPa to obtain a multilayer block.

Subsequently, the multilayer block is cut with a dicer or other device into individual discrete multilayer structures each dimensioned such that the multilayer structure can become the multilayer body 2 of each individual common-mode choke coil 1.

Subsequently, each discrete multilayer structure thus obtained is fired in a firing furnace at a temperature of about 860 to 900° C. for about 1 to 2 hours, for example, at a temperature of about 880° C. for about 1.5 hours to thereby obtain the multilayer body 2.

The fired multilayer body 2 is preferably placed into a rotating barrel together with media. Then, as the multilayer body 2 is rotated, the edge and corner portions of the multilayer body 2 are rounded or chamfered.

Subsequently, a conductive paste containing Ag and glass is applied to portions of the multilayer body 2 to which the connection end portions 23 to 26 are extended. Then, the conductive paste is baked at a temperature of, for example, about 810° C. for about 1 minute to thereby form an underlying film for each of the terminal electrodes 13 to 16. The underlying film has a thickness of, for example, about 5 μm. Then, for example, a Ni film and a Sn film are formed sequentially on the underlying film by electroplating. The Ni film and the Sn film each have a thickness of, for example, about 3 μm.

In this way, the common-mode choke coil 1 illustrated in FIG. 1 is completed.

As described above, the smaller the number of turns of the first coil conductor 17 and the number of turns of the second coil conductor 18, the more the high-frequency characteristics of the common-mode choke coil 1 can be improved. An experiment conducted to verify this observation is described below.

Exemplary Experiment

Samples described below are prepared. The multilayer body of the common-mode choke coil corresponding to each sample is dimensioned to have a length dimension L of 0.65 mm, a width dimension W of 0.50 mm, and a height dimension H of 0.30 mm Each of the first and second coil conductors of the common-mode choke coil corresponding to each sample has a line width of 0.018 mm.

1. Sample 1 (Embodiment)

Referring to FIG. 2, a common-mode choke coil corresponding to Sample 1 is prepared. In Sample 1, the first coil conductor 17 has a number of turns of 0.8, the second coil conductor 18 has a number of turns of 1, the distance SG1 from the first coil conductor 17 to each of the lateral face 7, the lateral face 8, and the end face 10 is 0.045 mm, and the distance SG2 from the second coil conductor 18 to each of the lateral face 7, the lateral face 8, the end face 9, and the end face 10 is 0.105 mm.

2. Sample 2 (Embodiment)

Referring to FIG. 2, a common-mode choke coil corresponding to Sample 2 is prepared. In Sample 2, the first coil conductor 17 has a number of turns of 1.5, the second coil conductor 18 has a number of turns of 1.5, the distance SG1 from the first coil conductor 17 to each of the lateral face 7, the lateral face 8, and the end face 10 is 0.045 mm, and the distance SG2 from the second coil conductor 18 to each of the lateral face 7, the lateral face 8, the end face 9, and the end face 10 is 0.105 mm.

Figure 6:
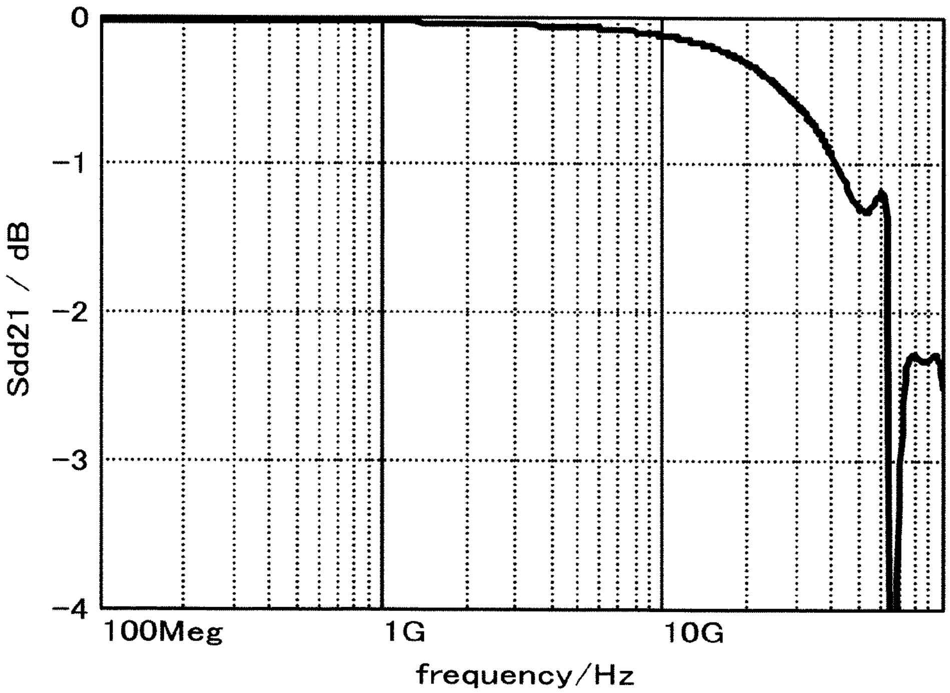
FIG. 6 illustrates the transmission characteristic for differential-mode components (Sdd21 transmission characteristic) obtained for the common-mode choke coil corresponding to Sample 1.
Figure 7:
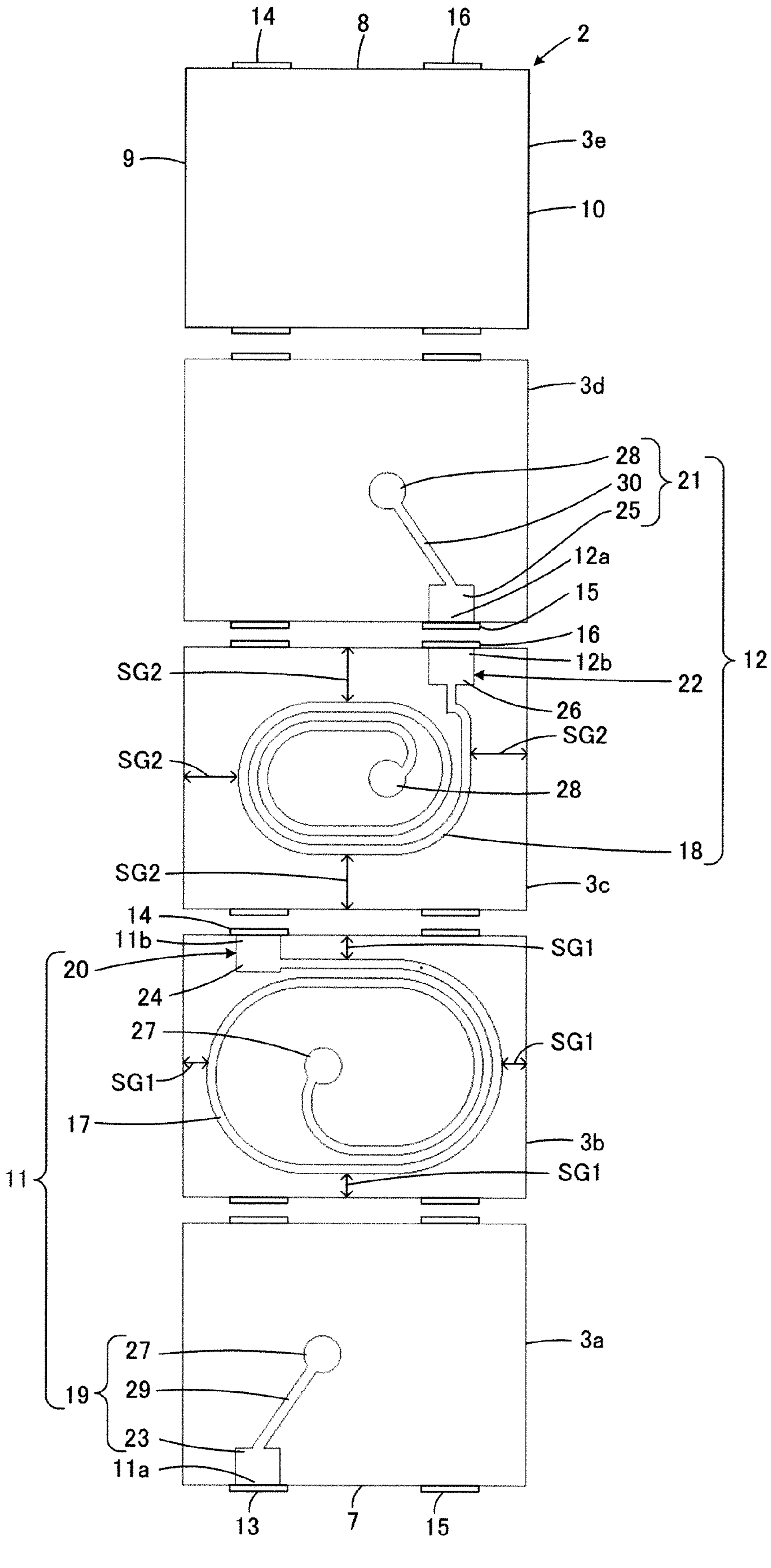
FIG. 7 is an exploded plan view, corresponding to FIG. 2, of the major components of a common-mode choke coil fabricated as a comparative example in the exemplary experiment.

FIG. 7 is a view corresponding to FIG. 2, illustrating Comparative Example described below. In FIG. 6, elements corresponding to the elements in FIG. 2 are denoted by like reference signs.

3. Sample 3 (Comparative Example)

Referring to FIG. 7, a common-mode choke coil corresponding to Sample 3 is prepared. In Sample 3, the first coil conductor 17 has a number of turns of 2, the second coil conductor 18 has a number of turns of 2, the distance SG1 from the first coil conductor 17 to each of the lateral face 7, the lateral face 8, the end face 9, and the end face 10 is 0.045 mm, and the distance SG2 from the second coil conductor 18 to each of the lateral face 7, the lateral face 8, the end face 9, and the end face 10 is 0.105 mm.

4. Sample 4 (Comparative Example)

Referring to FIG. 7, a common-mode choke coil corresponding to Sample 4 is prepared. In Sample 4, the first coil conductor 17 has a number of turns of 2, the second coil conductor 18 has a number of turns of 2, the distance SG1 from the first coil conductor 17 to each of the lateral face 7, the lateral face 8, the end face 9, and the end face 10 is 0.045 mm, and the distance SG2 from the second coil conductor 18 to each of the lateral face 7, the lateral face 8, the end face 9, and the end face 10 is 0.125 mm.

For each of the common-mode choke coils corresponding to Samples 1 to 4 above, the transmission characteristic for common-mode components (Scc21 transmission characteristic) and the transmission characteristic for differential-mode components (Sdd21 transmission characteristic) are obtained.

Figure 5:
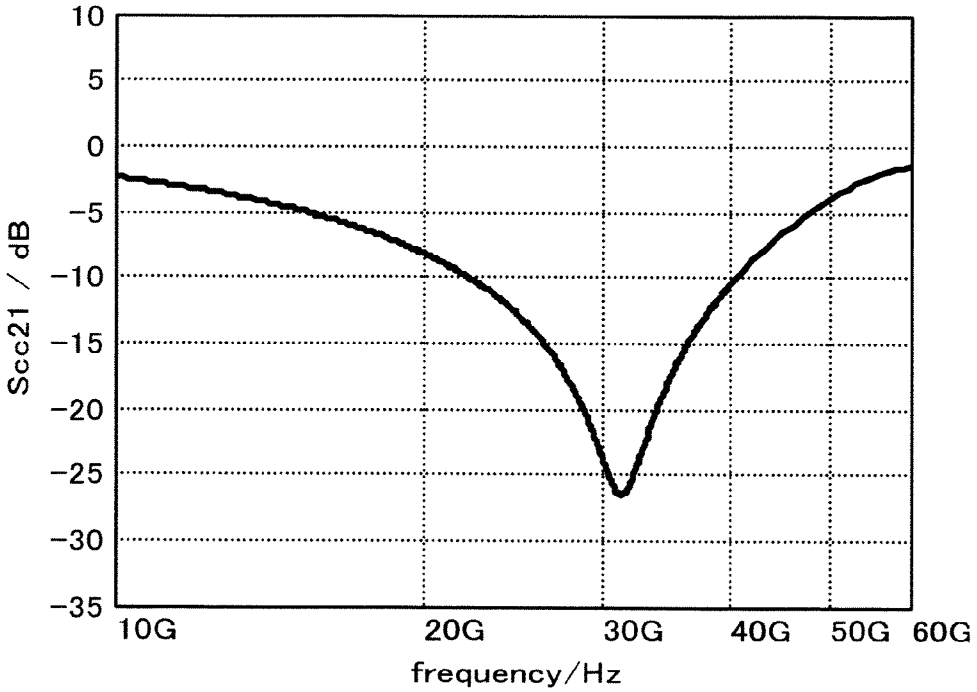
FIG. 5 illustrates the transmission characteristic for common-mode components (Scc21 transmission characteristic) obtained in an exemplary experiment conducted to verify the effects of the present disclosure, the transmission characteristic being obtained for a common-mode choke coil corresponding to Sample 1 that represents an embodiment of the present disclosure.

FIG. 5 and FIG. 6 respectively illustrate the Scc21 transmission characteristic and the Sdd21 transmission characteristic obtained for the common-mode choke coil corresponding to Sample 1.

From the characteristic charts in FIGS. 5 and 6, for Sample 1, the peak position and the minimum value (transmission coefficient at the peak position) are obtained with respect to the Scc21 transmission characteristic, and the respective transmission coefficients at 20 GHz, 30 GHz, and 40 GHz are obtained with respect to the Sdd21 transmission characteristic. The results are illustrated in Table 1 below. Although, for each of Sample (indicated as "S" in Table 1) 2 through Sample 4, the corresponding Scc21 transmission characteristic and the corresponding Sdd21 transmission characteristic are not illustrated in the drawings, the numerical values illustrated in Table 1 are obtained in the same manner as with Sample 1.

TABLE 1

| S No. | Number of turns 1st coil | Number of turns 2nd coil | Scc21 Peak position GHz | Scc21 Minimum value dB | Sdd21 20 GHz dB | Sdd21 30 GHz dB | Sdd21 40 GHz dB |
|---|---|---|---|---|---|---|---|
| 1 | 0.8 | 1 | 31.30 | −26.51 | −0.31 | −0.59 | −0.92 |
| 2 | 1.5 | 1.5 | 20.30 | −47.48 | −0.26 | −0.28 | −0.30 |
| 3 | 2 | 2 | 12.70 | −38.33 | −0.77 | −1.39 | −1.29 |
| 4 | 2 | 2 | 13.20 | −40.01 | −0.29 | −0.47 | −0.85 |

In Table 1, a comparison of Samples 1 and 2 with Samples 3 and 4 reveals that with respect to the Scc21 transmission characteristic, for each of Samples 1 and 2 whose first and second coil conductors each have a number of turns of less than 2, the peak position appears at a higher frequency than the corresponding peak position for each of Samples 3 and 4 whose first and second coil conductors each have a number of turns of 2. In other words, the Scc21 transmission characteristic can be made to become minimum at a frequency of greater than or equal to 20 GHz. This makes it possible to remove noise in higher frequency regions.

With respect to the Sdd21 transmission characteristic, for each of Samples 1 and 2, the transmission coefficient is greater than or equal to −1 dB between 20 to 40 GHz, and thus signal attenuation can be reduced. The reason for the greater transmission coefficient obtained for Sample 4 than for Sample 3 is assumed to be due to reduced stray capacitance as a result of Sample 4 having, when viewed in plan in the direction of the multilayer body, a smaller area of overlap between the first coil conductor and the second coil conductor than does Sample 3.

A comparison between Samples 1 and 2 reveals that for Sample 1 whose first and second coil conductors each have a number of turns smaller than that of Sample 2, the peak position of the Scc21 transmission characteristic appears at a higher frequency than that for Sample 2. More specifically, for Sample 1 in which at least one of the first and second coil conductors has a number of turns of less than or equal to 1, the Scc21 transmission characteristic can be made to become minimum at a frequency of greater than or equal to 30 GHz.

Although the present disclosure has been described above with reference to the illustrated embodiment, various other modifications are possible within the scope of the present disclosure.

For example, in one alternative embodiment, a single coil conductor included in at least one of the first and second coils may be divided in two into a first portion and a second portion, the first portion and the second portion may be disposed respectively along a first interface and a second interface, which are different interfaces between non-conductor layers, and the first portion and the second portion may be connected by a via-conductor. In this case, the number of turns of the above-mentioned single coil conductor is the sum of the number of turns of the first portion of the coil conductor and the number of turns of the second portion of the coil conductor.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A common-mode choke coil comprising:

a multilayer body including a plurality of non-conductor layers, the plurality of non-conductor layers being stacked and each made of a non-conductor, and the plurality of non-conductor layers including a first plurality of non-conductor layers and a second plurality of non-conductor layers;

a first coil and a second coil that are incorporated in the multilayer body, the first coil having a first end and a second end which are different ends of the first coil, the second coil having a third end and a fourth end which are different ends of the second coil, the first coil including a first coil conductor disposed along a first interface which is an interface between the first plurality of non-conductor layers, the second coil including a second coil conductor disposed along a second interface which is an interface between the second plurality of non-conductor layers and different from the first interface along which the first coil conductor is disposed, and the first coil conductor and the second coil conductor each having a number of turns of less than 2, at least part of the first coil conductor is curvilinear and at least part of the first coil conductor is positioned outside the second coil conductor, and part of the curvilinear first coil conductor curves toward the second coil conductor, and at least part of the second coil conductor is curvilinear and positioned inside the first coil conductor and part of the curvilinear second coil conductor curves toward the first coil conductor;

a first terminal electrode and a second terminal electrode that are provided on an outer surface of the multilayer body, the first terminal electrode being electrically connected to the first end, and the second terminal electrode being electrically connected to the second end; and a third terminal electrode and a fourth terminal electrode that are provided on an outer surface of the multilayer body, the third terminal electrode being electrically connected to the third end, and the fourth terminal electrode being electrically connected to the fourth end.

2. The common-mode choke coil according to claim 1, wherein at least one of the first coil conductor and the second coil conductor has a number of turns of less than or equal to 1.5.

3. The common-mode choke coil according to claim 2, wherein at least one of the first coil conductor and the second coil conductor has a number of turns of less than or equal to 1.

4. The common-mode choke coil according to claim 3, wherein the first coil has a first extended conductor and a second extended conductor, the first extended conductor providing the first coil with the first end, the second extended conductor providing the first coil with the second end, the plurality of non-conductor layers include a third plurality of non-conductor layers, and the first extended conductor includes a first connection end portion, the first connection end portion being disposed along a third interface, the third interface being an interface between the third plurality of non-conductor layers and different from the first interface along which the first coil conductor is disposed, the first connection end portion being connected to the first terminal electrode at a location on an outer surface of the multilayer body.

5. The common-mode choke coil according to claim 4, wherein the first extended conductor includes a first via-conductor, the first via-conductor being connected to the first coil conductor, the first via-conductor penetrating one non-conductor layer of the plurality of non-conductor layers in a thickness direction of the one non-conductor layer, the one non-conductor layer being located between the first coil conductor and the first connection end portion, and a first coupling part, the first coupling part having a linear shape, the first coupling part being disposed along the third interface along which the first connection end portion is disposed, the first coupling part connecting the first via-conductor and the first connection end portion to each other.

6. The common-mode choke coil according to claim 3, wherein the second coil includes a third extended conductor and a fourth extended conductor, the third extended conductor providing the second coil with the third end, the fourth extended conductor providing the second coil with the fourth end, the plurality of non-conductor layers include a fourth plurality of non-conductor layers, and the third extended conductor includes a third connection end portion, the third connection end portion being disposed along a fourth interface, the fourth interface being an interface between the fourth plurality of non-conductor layers and different from the second interface along which the second coil conductor is disposed, the third connection end portion being connected to the third terminal electrode at a location on an outer surface of the multilayer body.

7. The common-mode choke coil according to claim 6, wherein the third extended conductor includes a second via-conductor, the second via-conductor being connected to the second coil conductor, the second via-conductor penetrating one non-conductor layer of the plurality of non-conductor layers in a thickness direction of the one non-conductor layer, the one non-conductor layer being located between the second coil conductor and the third connection end portion, and a second coupling part, the second coupling part having a linear shape, the second coupling part being disposed along the fourth interface along which the third connection end portion is disposed, the second coupling part connecting the second via-conductor and the third connection end portion to each other.

8. The common-mode choke coil according to claim 2, wherein the first coil has a first extended conductor and a second extended conductor, the first extended conductor providing the first coil with the first end, the second extended conductor providing the first coil with the second end, the plurality of non-conductor layers include a third plurality of non-conductor layers, and the first extended conductor includes a first connection end portion, the first connection end portion being disposed along a third interface, the third interface being an interface between the third plurality of non-conductor layers and different from the first interface along which the first coil conductor is disposed, the first connection end portion being connected to the first terminal electrode at a location on an outer surface of the multilayer body.

9. The common-mode choke coil according to claim 8, wherein the first extended conductor includes a first via-conductor, the first via-conductor being connected to the first coil conductor, the first via-conductor penetrating one non-conductor layer of the plurality of non-conductor layers in a thickness direction of the one non-conductor layer, the one non-conductor layer being located between the first coil conductor and the first connection end portion, and a first coupling part, the first coupling part having a linear shape, the first coupling part being disposed along the third interface along which the first connection end portion is disposed, the first coupling part connecting the first via-conductor and the first connection end portion to each other.

10. The common-mode choke coil according to claim 8, wherein the second coil includes a third extended conductor and a fourth extended conductor, the third extended conductor providing the second coil with the third end, the fourth extended conductor providing the second coil with the fourth end, the plurality of non-conductor layers include a fourth plurality of non-conductor layers, and the third extended conductor includes a third connection end portion, the third connection end portion being disposed along a fourth interface, the fourth interface being an interface between the fourth plurality of non-conductor layers and different from the second interface along which the second coil conductor is disposed, the third connection end portion being connected to the third terminal electrode at a location on an outer surface of the multilayer body.

11. The common-mode choke coil according to claim 2, wherein the second coil includes a third extended conductor and a fourth extended conductor, the third extended conductor providing the second coil with the third end, the fourth extended conductor providing the second coil with the fourth end, the plurality of non-conductor layers include a fourth plurality of non-conductor layers, and the third extended conductor includes a third connection end portion, the third connection end portion being disposed along a fourth interface, the fourth interface being an interface between the fourth plurality of non-conductor layers and different from the second interface along which the second coil conductor is disposed, the third connection end portion being connected to the third terminal electrode at a location on an outer surface of the multilayer body.

12. The common-mode choke coil according to claim 11, wherein the third extended conductor includes a second via-conductor, the second via-conductor being connected to the second coil conductor, the second via-conductor penetrating one non-conductor layer of the plurality of non-conductor layers in a thickness direction of the one non-conductor layer, the one non-conductor layer being located between the second coil conductor and the third connection end portion, and a second coupling part, the second coupling part having a linear shape, the second coupling part being disposed along the fourth interface along which the third connection end portion is disposed, the second coupling part connecting the second via-conductor and the third connection end portion to each other.

13. The common-mode choke coil according to claim 1, wherein the first coil has a first extended conductor and a second extended conductor, the first extended conductor providing the first coil with the first end, the second extended conductor providing the first coil with the second end, the plurality of non-conductor layers include a third plurality of non-conductor layers, and the first extended conductor includes a first connection end portion, the first connection end portion being disposed along a third interface, the third interface being an interface between the third plurality of non-conductor layers and different from the first interface along which the first coil conductor is disposed, the first connection end portion being connected to the first terminal electrode at a location on an outer surface of the multilayer body.

14. The common-mode choke coil according to claim 13, wherein the first extended conductor includes a first via-conductor, the first via-conductor being connected to the first coil conductor, the first via-conductor penetrating one non-conductor layer of the plurality of non-conductor layers in a thickness direction of the one non-conductor layer, the one non-conductor layer being located between the first coil conductor and the first connection end portion, and a first coupling part, the first coupling part having a linear shape, the first coupling part being disposed along the third interface along which the first connection end portion is disposed, the first coupling part connecting the first via-conductor and the first connection end portion to each other.

15. The common-mode choke coil according to claim 14, wherein the second coil includes a third extended conductor and a fourth extended conductor, the third extended conductor providing the second coil with the third end, the fourth extended conductor providing the second coil with the fourth end, the plurality of non-conductor layers include a fourth plurality of non-conductor layers, and the third extended conductor includes a third connection end portion, the third connection end portion being disposed along a fourth interface, the fourth interface being an interface between the fourth plurality of non-conductor layers and different from the second interface along which the second coil conductor is disposed, the third connection end portion being connected to the third terminal electrode at a location on an outer surface of the multilayer body.

16. The common-mode choke coil according to claim 13, wherein the second coil includes a third extended conductor and a fourth extended conductor, the third extended conductor providing the second coil with the third end, the fourth extended conductor providing the second coil with the fourth end, the plurality of non-conductor layers include a fourth plurality of non-conductor layers, and the third extended conductor includes a third connection end portion, the third connection end portion being disposed along a fourth interface, the fourth interface being an interface between the fourth plurality of non-conductor layers and different from the second interface along which the second coil conductor is disposed, the third connection end portion being connected to the third terminal electrode at a location on an outer surface of the multilayer body.

17. The common-mode choke coil according to claim 16, wherein the third extended conductor includes a second via-conductor, the second via-conductor being connected to the second coil conductor, the second via-conductor penetrating one non-conductor layer of the plurality of non-conductor layers in a thickness direction of the one non-conductor layer, the one non-conductor layer being located between the second coil conductor and the third connection end portion, and a second coupling part, the second coupling part having a linear shape, the second coupling part being disposed along the fourth interface along which the third connection end portion is disposed, the second coupling part connecting the second via-conductor and the third connection end portion to each other.

18. The common-mode choke coil according to claim 1, wherein the second coil includes a third extended conductor and a fourth extended conductor, the third extended conductor providing the second coil with the third end, the fourth extended conductor providing the second coil with the fourth end, the plurality of non-conductor layers include a fourth plurality of non-conductor layers, and the third extended conductor includes a third connection end portion, the third connection end portion being disposed along a fourth interface, the fourth interface being an interface between the fourth plurality of non-conductor layers and different from the second interface along which the second coil conductor is disposed, the third connection end portion being connected to the third terminal electrode at a location on an outer surface of the multilayer body.

19. The common-mode choke coil according to claim 18, wherein the third extended conductor includes a second via-conductor, the second via-conductor being connected to the second coil conductor, the second via-conductor penetrating one non-conductor layer of the plurality of non-conductor layers in a thickness direction of the one non-conductor layer, the one non-conductor layer being located between the second coil conductor and the third connection end portion, and a second coupling part, the second coupling part having a linear shape, the second coupling part being disposed along the fourth interface along which the third connection end portion is disposed, the second coupling part connecting the second via-conductor and the third connection end portion to each other.

20. The common-mode choke coil according to claim 1, wherein the first coil conductor and the second coil conductor each having the number of turns less than 2 is configured to reduce stray capacitance at gigahertz frequencies as compared to turns greater than 2.

* * * * *